United States Patent [19]
Biro et al.

[11] Patent Number: 5,477,027
[45] Date of Patent: Dec. 19, 1995

[54] ELECTRICAL SOLDERING DEVICE WITH A SPLIT CYLINDER TRANSFORMER SECONDARY

[76] Inventors: Laszlo Biro, Ungar Zriny ut 3/5, H-4551 Nyiregyaza; Franz Molnar, Kezdout 41, H-4551; Attila Toth, Zechmeisterstrasse 1, A-4030 Linz, AustriaNyiregyaza-Oros, both of Hungary

[21] Appl. No.: 167,492

[22] Filed: Dec. 14, 1993

[30] Foreign Application Priority Data

Dec. 14, 1992 [DE] Germany .................... 9216992 U

[51] Int. Cl.⁶ .................................................. B23K 3/03
[52] U.S. Cl. ............................................. 219/235; 336/82
[58] Field of Search .............................. 219/234, 235; 336/82, 223; 324/127

[56] References Cited

U.S. PATENT DOCUMENTS

| | | | |
|---|---|---|---|
| 2,314,865 | 3/1943 | Bierwirth | 219/235 X |
| 2,570,762 | 10/1951 | Caliri | 219/235 X |
| 2,814,712 | 11/1957 | Fulmer | 219/235 |
| 4,107,701 | 4/1977 | Mittelmann | 336/82 X |
| 4,558,310 | 12/1985 | McAllise | 324/127 |
| 4,766,289 | 8/1988 | Santoro | 219/235 |
| 5,287,087 | 2/1994 | Jencks | 324/127 X |

FOREIGN PATENT DOCUMENTS 374392 9/1983 Austria .

*Primary Examiner*—John A. Jeffery
*Attorney, Agent, or Firm*—Herbert L. Lerner; Laurence A. Greenberg; Werner H. Stemer

[57] ABSTRACT

An electrical soldering device in the form of a soldering gun has a transformer disposed in a housing with a primary winding and a secondary winding. The transformer is supplied from an A.C. source, such as a voltage mains. The soldering tip is in the form of a resistance wire bent into a loop and connected to the secondary winding of said transformer. The secondary winding of the transformer is formed of a cylindrical sleeve of metallic material, preferably copper, surrounding the coil of the primary winding. The cylindrical sleeve has a continuous slit formed therein extending approximately parallel to its cylinder axis. The slit defines mutually opposite edge regions to which the resistance wire is connected. A frequency converter connected in the current supply line to the transformer increases the frequency, preferably into the kilohertz range.

8 Claims, 2 Drawing Sheets

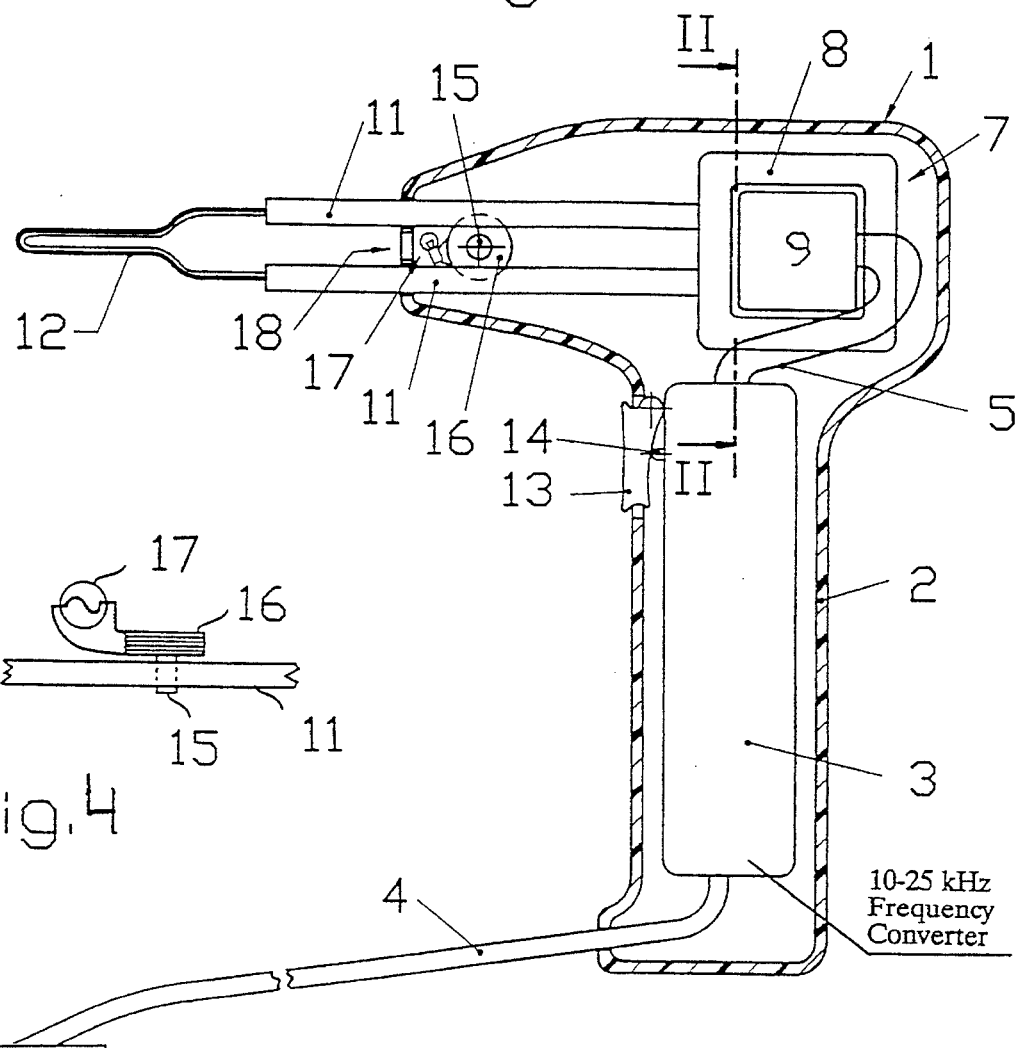
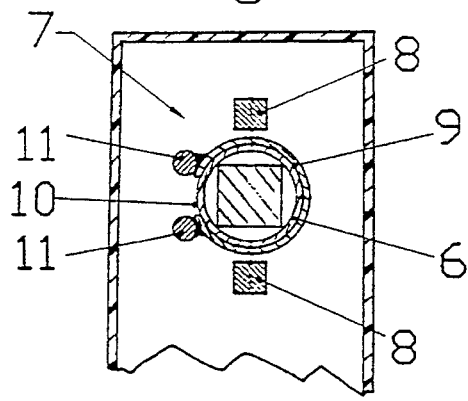

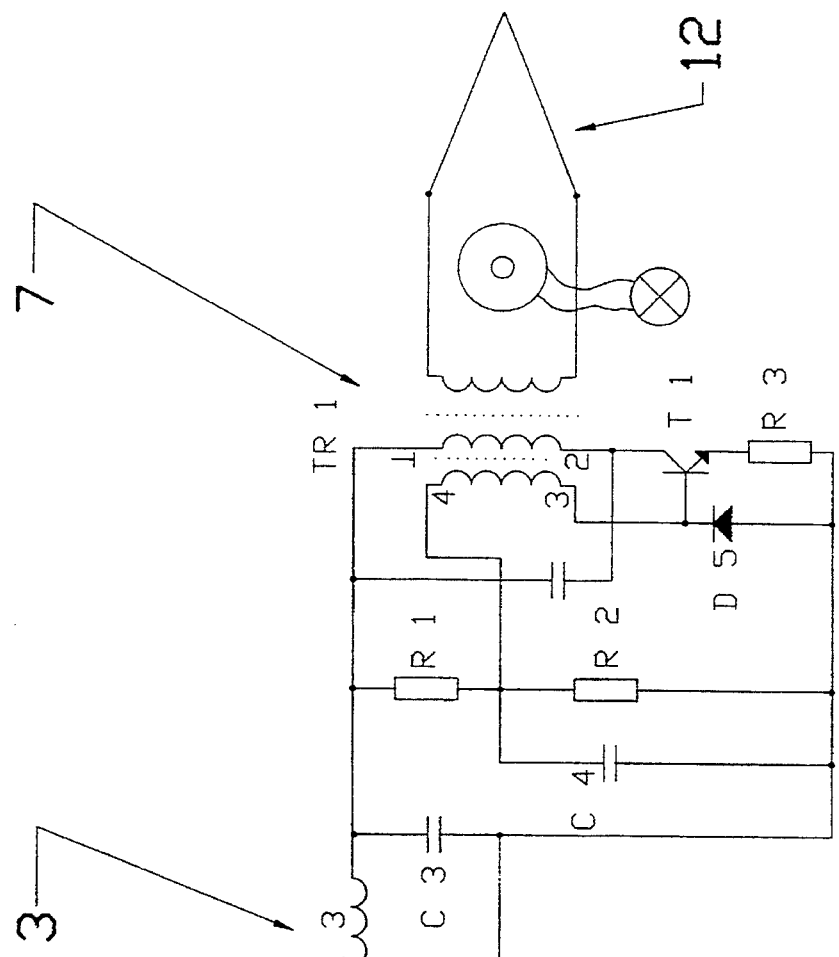
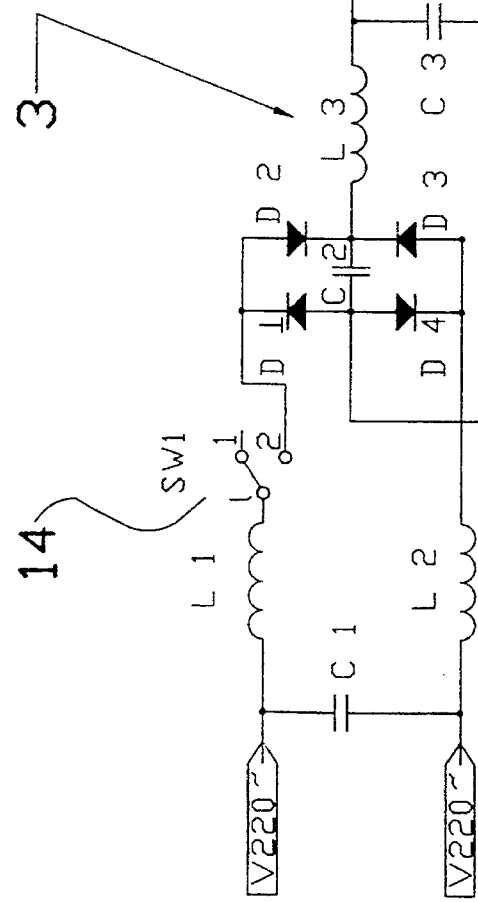
Fig.3

ELECTRICAL SOLDERING DEVICE WITH A SPLIT CYLINDER TRANSFORMER SECONDARY

BACKGROUND OF THE INVENTION

1. Field of the Invention

The invention relates to an electrical soldering device, with a transformer disposed in a housing whose primary winding is connectible to an alternating current source, for instance through a cable with a plug to be connected into a socket, and whose secondary winding is connected to a loop-shaped, bent resistance wire which forms the soldering tip.

2. Description of the Related Art

Soldering devices of this general kind, usually referred to a soldering guns with reference to their pistol-like shape, have been heretofore known. When the primary winding of the transformer is connected to an A.C. source, such as a conventional A.C. mains providing a voltage of 110V (220V) and a frequency of 60 Hz (50 Hz), a current of considerable current strength flows in the resistance wire which forms the soldering tip. Due to the internal resistance of the wire, the resistance wire is quickly heated to a temperature which causes the solder metal to melt when it comes into contact with the resistance wire.

Such soldering devices may also be used for desoldering. In that case, a desoldering tip according to Austrian Patent AT-PS 374 392 may be provided for instance.

One of the drawbacks of the prior art electrical soldering devices is their relatively great weight caused by the required transformer in the housing. The weight of the transformer is thereby mainly determined by its core, which is formed from transformer metal sheets. The relatively great weight of those soldering devices causes the hand of the operator to tire quickly, making it increasingly difficult during extended soldering to accurately guide the soldering tip at a soldering location. This is particularly disadvantageous in the case of small, closely adjacent soldering locations.

In an effort to reduce the weight of such soldering devices, it has heretofore been proposed to connect a frequency converter into the supply line. The converter is laid out such that the transformer is supplied with a frequency which is increased relative to the frequency of the alternating current source (60/50 Hz), in particular to a frequency in the kilohertz range. While this makes it possible to dimension the transformer core smaller while maintaining its power capacity—and thus reduce its weight—this still does not lead to an optimal configuration of the soldering device. The primary reason for that is found in the fact that the transformer of that prior art configuration still exhibits considerable dimensions. Furthermore, those prior art dimensions are yet enlarged when the transformer is provided with the usual tertiary winding for operating a control lamp.

SUMMARY OF THE INVENTION

It is accordingly an object of the invention to provide an electrical soldering device, which overcomes the hereinafore-mentioned disadvantages of the heretofore-known devices of this general type and which offers a substantial reduction in the weight and size dimensions relative to the prior art devices of comparable power rating.

With the foregoing and other objects in view there is provided, in accordance with the invention, an electrical soldering device, which comprises the following features:

a) a housing and a transformer disposed in the housing. The transformer has a primary winding with a coil and a secondary winding; and supply means are connected to the primary winding for electrically connecting the transformer to an alternating current source;

b) a soldering tip in the form of a loop-shaped resistance wire in disposed outside the housing and it is electrically connected to the secondary winding of the transformer;

c) the secondary winding of the transformer is formed of a cylindrical sleeve of metallic material, preferably copper. The sleeve surrounds the coil of the primary winding. The cylindrical sleeve has a continuous slit formed therein extending approximately parallel to a cylinder axis thereof. The slit defines mutually opposite edge regions. The resistance wire is connected at the mutually opposite edge regions of the slit.

In accordance with an added feature of the invention, the soldering device includes a frequency converter connected in the supply line to the transformer for increasing a frequency of an alternating current received from the alternating current source and for supplying the transformer with a relatively higher frequency. The frequency is preferably raised into the kilohertz range.

In other words, the invention provides for the secondary winding of the transformer to be formed of a cylindrical sleeve of metallic material, preferably of copper, which surrounds the coil with the primary winding and which is provided with a slit extending along the entire sleeve approximately parallel to its cylinder axis. The resistance wire is connected to the two mutually opposite edge regions of the slit. The secondary winding thus consists only of a single winding. Since it is formed of a cylindrical sleeve, it has a large cross section, so that the dimensions of the transformer and also its weight can be substantially reduced. This means further that the housing can be made smaller and therefore more handy.

In accordance with another feature of the invention, the soldering device includes two electrically conductive rods disposed in the housing in a spaced-apart relationship and extending parallel to one another, the rods being connected between respective ones of the mutually opposite edge regions of the slit and the resistance wire, and including a rod-like coil core formed of ferromagnetic material projecting into a space formed between the rods, a coil winding wound about the coil core, and a control lamp electrically connected to the coil winding.

The soldering device formed in accordance with that embodiment of the invention makes an advantageous feed connection of the control lamp possible, by obviating the need for a tertiary winding of the transformer. The electrical connection of the resistance wire with the edge regions of the sleeve is effected through two electrically conducting rods. The rods extend parallel to one another and in a spaced-apart relationship. A rod-shaped coil core of ferromagnetic material projects in between the rods and the winding of the core is electrically connected with a control lamp. Accordingly, no tertiary winding is required of the transformer for supplying the control lamp, instead, the coil for that supply is disposed in the region of the electrically conductive rods through which the supply for the resistance wire is effected and which are surrounded by the housing in any case. In other words, space for the coil is provided anyway. The embodiment according to the invention has the further advantage that a voltage is induced in the coil, and the control lamp is illuminated, only when a current flows in the electrically conductive rods and therefore in the resistance wire, i.e. when the soldering device is in fact in an operational state in which the resistance wire is being heated.

In accordance with a concomitant feature of the invention, a portion of the coil core protrudes laterally from the coil winding and only the protruding portion of the coil core projects between the electrically conductive rods.

Optimal space management results are attained in this way, even in the case of a small space between the two electrically conductive rods, when a portion of the coil core protrudes laterally from the coil. In that case only the protruding part of the coil core is disposed between the electrically conductive rods. That part of the coil core laterally protruding from the coil has a relatively small diameter, so that that part can be easily disposed between the rods, whereby the coil having the larger diameter is then disposed above or below the plane defined by the two electrically conductive rods.

Other features which are considered as characteristic for the invention are set forth in the appended claims.

Although the invention is illustrated and described herein as embodied in an electrical soldering device, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a diagrammatic longitudinal section through an electrical soldering device according to the invention;

FIG. 2 is a sectional view through the transformer taken along the line II—II in FIG. 1;

FIG. 3 is a circuit schematic of the frequency converter with the transformer and the soldering tip; and FIG. 4 is a partial, top-plan view showing the coil configuration for supplying the control lamp.

DESCRIPTION OF THE PREFERRED EMBODIMENTS

Referring now to the figures of the drawing in detail and first, particularly, to FIG. 1 thereof, there is seen an electrical soldering device housing 1. The housing 1 is formed, in a conventional manner, from two members which are interconnected with screws or the like, such that the inside of the housing is accessible. The housing 1 has the general form of a pistol, with a handle 2. A frequency converter 3 is disposed in the handle 2. The frequency converter 3 is supplied from an A.C. current source via a cable 4, for instance from a regular A.C. mains at a voltage of 110V and a frequency of 60 Hz. A non-illustrated sensing and conversion circuit may be provided or a non-illustrated toggle for switching the supply between 110V and 220V, so as to provide for universal connectibility. The cable 4 is provided with a non-illustrated plug which can be plugged into a wall socket.

An increase of the frequency occurs in the frequency converter 3 to a value in the kilohertz range, for instance between 10 and 25 kHz. This frequency, through lines 5 provided on the inside of the housing, is used to feed the primary winding 6 of a transformer 7 which is also disposed in the housing 1 and which is provided with a transformer core 8.

Referring now to FIG. 2, the secondary winding of the transformer is formed on a coil of a copper sleeve 9 surrounding the primary winding 6. A continuous slit 10 is formed in the sleeve 9 which extends approximately parallel to the cylinder axis. It is seen that the secondary winding is formed as a single turn winding. Copper rods 11 which extend parallel to one another and in a spaced-apart relationship are soldered to the mutually opposite edge regions of the slit 10. The rods 11 protrude outwardly from the housing 1. A loop-shaped, bent resistance wire 12 is connected at the distal ends of the rods 11 and forms the soldering tip.

A rod-shaped core 15 of ferromagnetic material is disposed between the two copper rods 11. The core 15 protrudes laterally from a coil 16 disposed behind the plane defined by the two copper rods 11. The diameter of the coil winding 16 can be greater than the spacing between the two copper rods 11. The ends of the winding of the coil 16 are electrically connected with a control lamp 17, which is visible through a window 18 provided in the housing 1.

When the soldering device according to the invention is in operation, a current flows through the two copper rods 11 which causes the resistance wire 12 to heat up. At the same time, through the intermediary of the coil core 15, an emf is induced in the coil 16, so that a current flows in the coil winding 16 which causes the control lamp 17 to illuminate. FIG. 4 shows the portion of the coil core 15 which protrudes from the coil winding 16 and projects into the space between the rods 11. The coil winding is connected to the lamp 17.

The soldering device is switched on with a rocker 13, which is pivotally mounted in the housing and which cooperates with a switch 14 provided at the frequency converter 3.

With reference to FIG. 3, which details an exemplary embodiment of the frequency converter 3, a mains voltage 110 V or 220V is picked up at 4. Downstream of the switch 14, which serves to turn on the soldering device, the current is subjected to a rectification in a full wave rectifier 19. An HF oscillator includes a capacitor C4, a diode D5, a transistor switch T1 and a number of resistors. The transformer 7 is a load transformer with a primary winding 6 and a feedback winding 20 feeding back into the HF oscillation. As mentioned above, the secondary winding 9 is in the form of a sleeve, i.e. a single turn winding.

We claim:

1. An electrical soldering device, comprising:

a housing, a transformer disposed in said housing and having a primary winding with a coil and a secondary winding, and supply means connected to said primary winding for electrically connecting said transformer to an alternating current source;

a soldering tip in the form of a loop-shaped resistance wire disposed outside said housing and electrically connected to said secondary winding of said transformer;

said secondary winding of said transformer being formed of a cylindrical sleeve of metallic material surrounding said coil of said primary winding, said cylindrical sleeve having a continuous slit formed therein extending approximately parallel to a cylinder axis thereof, said slit defining mutually opposite edge regions, and said resistance wire being connected to said mutually opposite edge regions of said slit; and two electrically conductive rods disposed in said housing in a spaced-apart relationship and extending parallel to one another, said rods being connected between respective ones of said mutually opposite edge regions of said slit and said resistance wire, and including a rod-like coil core formed of ferromagnetic material projecting into a space formed between said rods, a coil winding wound about said coil core, and a control lamp electrically connected to said coil winding.

2. The soldering device according to claim 1, wherein said cylindrical sleeve is formed of copper.

3. The soldering device according to claim 1, wherein a portion of said coil core protrudes laterally from said coil winding and only the protruding portion of said coil core projects between said electrically conductive rods.

4. An electrical soldering device, comprising:

a housing, a transformer disposed in said housing and having a primary winding with a coil and a secondary winding, and supply means connected to said primary winding for electrically connecting said transformer to an alternating current source;

a soldering tip in the form of a loop-shaped resistance wire disposed outside said housing and electrically connected to said secondary winding of said transformer; and frequency converter means connected in said supply means for increasing a frequency of an alternating current received from the alternating current source and for supplying said transformer with a relatively higher frequency;

said secondary winding of said transformer being formed of a cylindrical sleeve of metallic material surrounding said coil of said primary winding, said cylindrical sleeve having a continuous slit formed therein extending approximately parallel to a cylinder axis thereof, said slit defining mutually opposite edge regions, and said resistance wire being connected to said mutually opposite edge regions of said slit.

5. The soldering device according to claim 4, wherein said frequency converter means includes means for increasing the frequency received from the alternating current source into a kilohertz range.

6. The soldering device according to claim 4, including two electrically conductive rods disposed in said housing in a spaced-apart relationship and extending parallel to one another, said rods being connected between respective ones of said mutually opposite edge regions of said slit and said resistance wire, and including a rod-like coil core formed of ferromagnetic material projecting into a space formed between said rods, a coil winding wound about said coil core, and a control lamp electrically connected to said coil winding.

7. The soldering device according to claim 6, wherein a portion of said coil core protrudes laterally from said coil winding and only the protruding portion of said coil core projects between said electrically conductive rods.

8. The soldering device according to claim 4, wherein said cylindrical sleeve is formed of copper.

* * * * *